(12) United States Patent
Inagaki et al.

(10) Patent No.: US 8,731,710 B2
(45) Date of Patent: May 20, 2014

(54) LIBRARY APPARATUS

(75) Inventors: Hiroyasu Inagaki, Kawasaki (JP); Koujiro Hashimoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 272 days.

(21) Appl. No.: 12/915,593

(22) Filed: Oct. 29, 2010

(65) Prior Publication Data

US 2011/0106299 A1    May 5, 2011

(30) Foreign Application Priority Data

Nov. 4, 2009 (JP) ................................ 2009-253008

(51) Int. Cl.
*G06F 7/00* (2006.01)
*G11B 15/68* (2006.01)

(52) U.S. Cl.
USPC ........... 700/221; 700/213; 700/214; 700/220; 700/222

(58) Field of Classification Search
None
See application file for complete search history.

(56) References Cited

U.S. PATENT DOCUMENTS

| 5,723,859 A | * | 3/1998 | Kerschner et al. ............ 250/234 |
| 7,480,111 B2 | | 1/2009 | Ikeuchi et al. |
| 2005/0004703 A1 | * | 1/2005 | Christie, Jr. .................. 700/214 |
| 2005/0007692 A1 | * | 1/2005 | Thompson et al. ............. 360/93 |
| 2009/0161250 A1 | * | 6/2009 | Oohara ....................... 360/92.1 |

FOREIGN PATENT DOCUMENTS

| JP | 8-53205 A | 2/1996 |
| JP | 2005-216389 A | 8/2005 |
| JP | 2009-15976 A | 1/2009 |
| JP | 2009-217877 | 9/2009 |

OTHER PUBLICATIONS

Japanese Office Action mailed Sep. 3, 2013 for corresponding Japanese Application No. 2009-253008, with Partial English-language Translation.
Office Action of Japanese Patent Application 2009-253008 dated Feb. 18, 2014, with Full English Translation of the Office Action.

* cited by examiner

*Primary Examiner* — Yolanda Cumbess
(74) *Attorney, Agent, or Firm* — Fujitsu Patent Center

(57) ABSTRACT

A library apparatus includes a rack that holds a magazine loaded with plural tape cartridges, the rack including an insertion slot through which the magazine is inserted, a conveying mechanism that attaches the plural tape cartridges to the magazine and detaches the plural tape cartridges from the magazine, the conveying mechanism including a reader for reading an identifier provided on each of the plural tape cartridges, and a control device that moves the conveying mechanism, prior to the magazine being inserted into the insertion slot, to an identifier reading position enabling the reader to read the identifiers as the magazine is inserted through the insertion slot.

9 Claims, 10 Drawing Sheets

INSERTING DIRECTION A

INSERTING DIRECTION A

VERTICAL MOVING DIRECTION C

PORTION E

LIBRARY APPARATUS

CROSS-REFERENCE TO RELATED APPLICATIONS

This application is based upon and claims the benefit of priority of the prior Japanese Patent Application No. 2009-253008 filed on Nov. 4, 2009, the entire contents of which are incorporated herein by reference.

FIELD

The embodiments discussed herein are related to a magazine type library apparatus including a conveying mechanism for conveying tape cartridges.

BACKGROUND

As an example of an apparatus for storing large amounts of data, there is a library apparatus that loads and stores many tape cartridges. The library apparatus sequentially extracts tape cartridges stored therein and loads the tape cartridges into a recording/reproduction apparatus for reading data from or writing data to the tape cartridges. Normally, tape cartridges are installed on an installation shelf inside the library apparatus. The installation shelf has one or more racks fixed to the inside of the library apparatus and a detachable magazine that can be extracted from the library apparatus. One or more tape cartridges are installed in the magazine in an aligned manner. The tape cartridges are conveyed to a recording/reproduction apparatus or an installation shelf of a given destination by a cartridge conveying mechanism.

In a case of ejecting a cartridge from the library apparatus, the magazine in which the cartridge is installed is required to be extracted from the library apparatus. Further, in a case of installing a cartridge into the library apparatus, the magazine which is to hold the cartridge is required to be extracted from the library apparatus.

With a conventional library apparatus, after a magazine is completely installed inside the library apparatus, data for identifying the tape cartridges are obtained by scanning all of the tape cartridges with a cartridge conveying mechanism and reading data from barcode labels adhered to the backs of the tape cartridges (this operation is referred to as an "inventory operation"). This inventory operation requires more time to read barcode labels as the number of tape cartridges increase. This results in the increase of the time for the library apparatus to become operational.

Although there is a known method for reducing barcode reading time by having plural barcode readers placed at a door part of a library apparatus into which tape cartridges (magnetic tapes) are installed, this method requires barcode readers to be provided to all of the magazines. Thus, the number of barcode readers increases as the number of magazines for storing the tape cartridges increases. This leads to a problem of high manufacturing costs.

SUMMARY

According to an aspect of the invention, there is provided a library apparatus includes a rack that holds a magazine loaded with plural tape cartridges, the rack including an insertion slot through which the magazine is inserted, a conveying mechanism that attaches the plural tape cartridges to the magazine and detaches the plural tape cartridges from the magazine, the conveying mechanism including a reader for reading an identifier provided on each of the plural tape cartridges, and a control device that moves the conveying mechanism, prior to the magazine being inserted into the insertion slot, to an identifier reading position enabling the reader to read the identifiers as the magazine is inserted through the insertion slot.

The object and advantages of the invention will be realized and attained by means of the elements and combinations particularly pointed out in the claims.

It is to be understood that both the foregoing generation description and the followed detailed description are exemplary and explanatory and are not restrictive of the invention, as claimed.

DESCRIPTION OF EMBODIMENTS

In the following, embodiments of the present invention are described with reference to the accompanying drawings.

Figure 1:
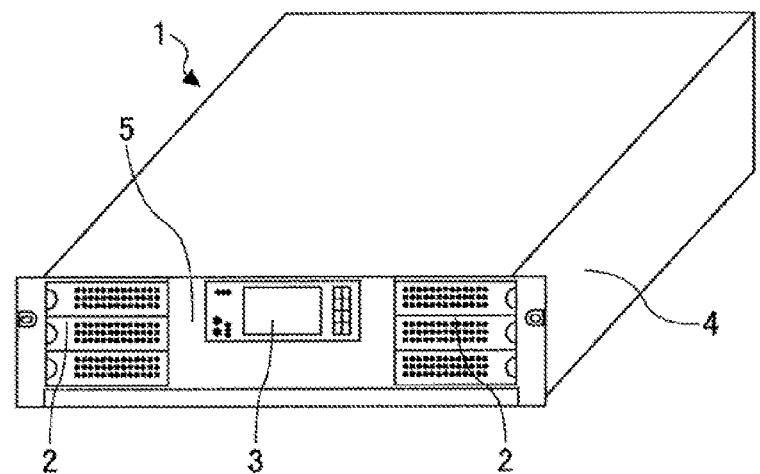
FIG. 1 is a schematic diagram illustrating the outside of a library apparatus according to an embodiment of the present invention.

FIG. 1 is a schematic diagram illustrating the outside of a library apparatus 1 according to an embodiment of the present invention. The library apparatus 1 is a data storage apparatus that performs data recording, data reproduction, or both on a recording medium installed in a cartridge. The recording medium may be, for example, a magnetic tape or an optical disk. In this embodiment, a library apparatus is described as an example of the library apparatus 1. An operator panel 3 is provided on a front surface of the library apparatus 1. The operator panel 3 is for displaying data and operating the library apparatus 1. More specifically, in this embodiment, the operator panel 3 is positioned at a center part of the front surface of the library apparatus 1. For example, data pertaining to the operational status of the library apparatus 1 or input data are displayed in the operator panel 3. An operator commands (instructs) the library apparatus 1 to perform a process(es) by operating the operator panel 3 based on data displayed on the operator panel 3.

In this embodiment, magazines 2 for storing tape cartridges 6 are arranged on the left and right sides of the library apparatus 1. In this embodiment, the magazine 2 positioned on the left side of the library apparatus 1 may also be referred to as "left magazine 2", and the magazine 2 positioned on the right side of the library apparatus 1 may also be referred to as "right magazine 2". The magazines 2 can be inserted into and ejected from the library apparatus 1. The outside of the library apparatus 1 is covered by a housing 4.

Figure 2:
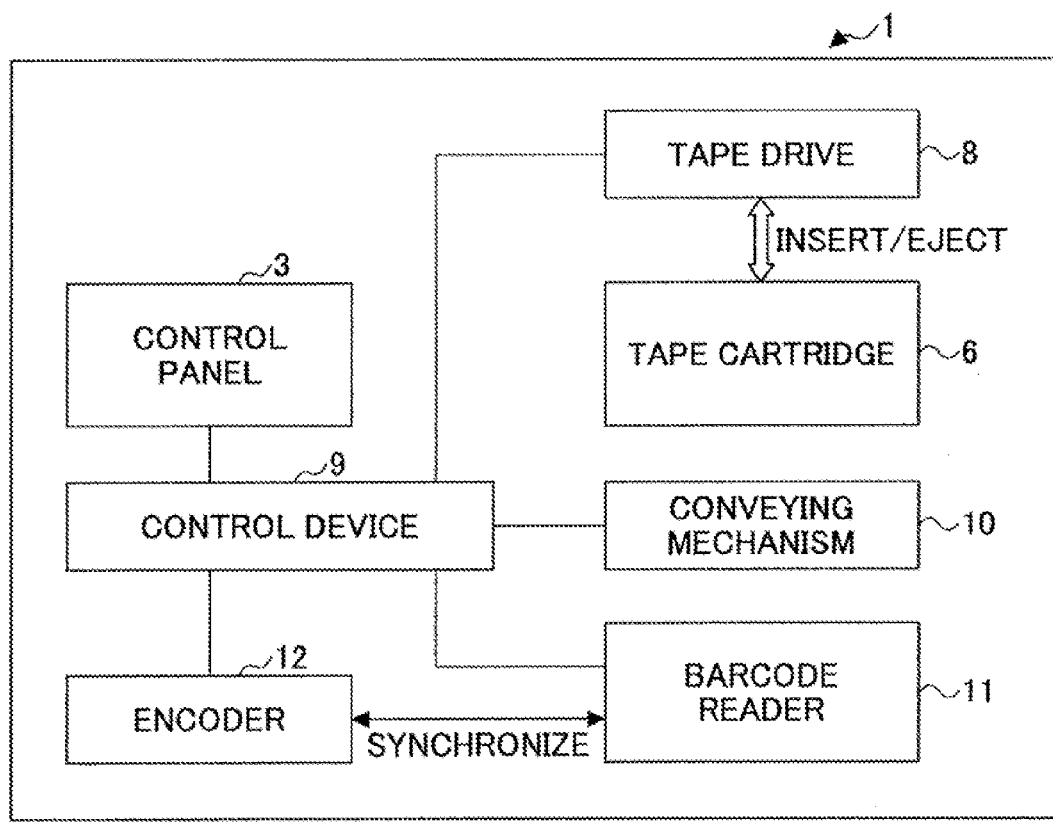
FIG. 2 is a schematic diagram illustrating an exemplary configuration of a library apparatus according to an embodiment of the present invention.

FIG. 2 is a schematic diagram illustrating an exemplary configuration of the library apparatus 1 according to an embodiment of the present invention. The library apparatus 1 includes, for example, the control panel 3, a tape drive 8, a control device 9, a conveying mechanism 10, a barcode reader 11, and an encoder 12.

Figure 3:
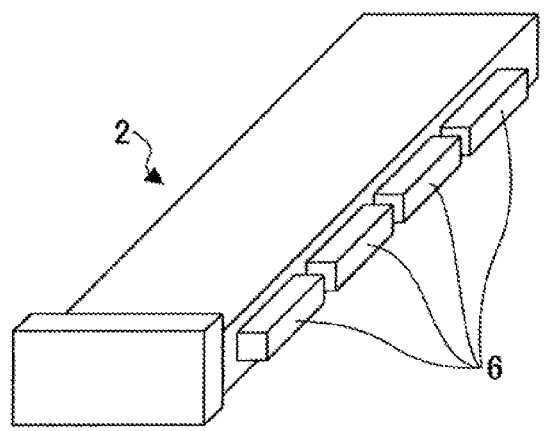
FIG. 3 is a schematic diagram illustrating the outside of a magazine according to an embodiment of the present invention in a state where tape cartridges are mounted in a magazine.
Figure 4:
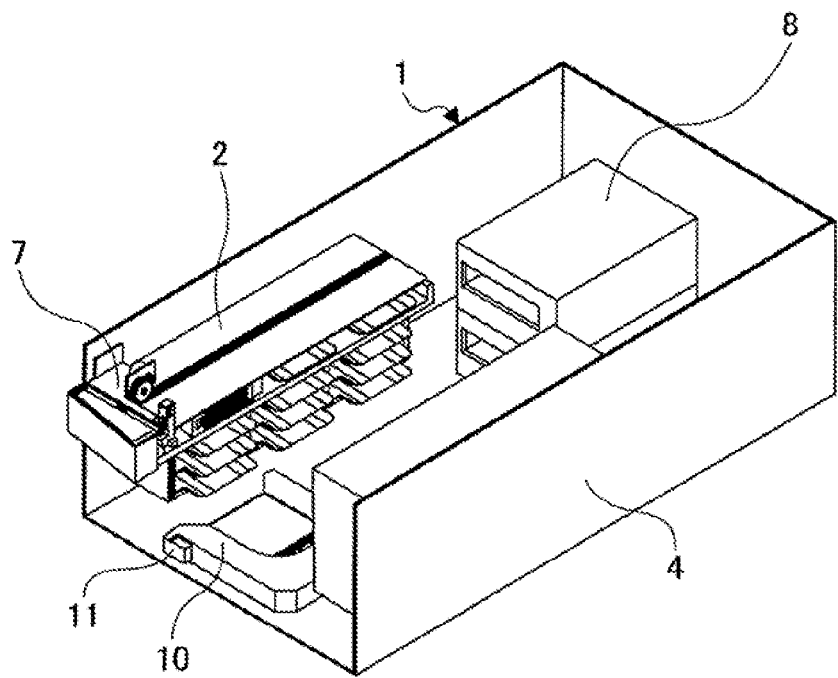
FIG. 4 is a schematic diagram for describing the inside of a housing of a library apparatus according to an embodiment of the present invention.

FIG. 3 is a schematic diagram illustrating the outside of the magazine 2 according to an embodiment of the present invention in a state where tape cartridges 6 are mounted in the magazine 2. As illustrated in FIG. 3, plural tape cartridges 6 can be mounted in the magazine 2. A barcode label 13 (see FIG. 6), serving as an identifier for identifying tape cartridges 6, is adhered to each cartridge 6. Data for identifying the cartridge 6 is recorded on the barcode label 13. When the magazine 2 is inserted into the library apparatus 1, the barcode reader 11 reads the barcode labels 13 adhered to the tape cartridges 6 with an optical sensor 11a (see FIG. 9) provided inside the barcode reader 11. The control device 9 obtains data of the tape cartridges 6 from the data read out from the barcode label 13 and manages the obtained data. FIG. 4 is a schematic diagram for describing the inside of the housing 4 of the library apparatus 1 according to an embodiment of the present invention. Plural magazines 2 can be installed in the library apparatus 1. The magazines 2 are installed in a rack 7 provided inside the library apparatus 1. As illustrated in FIG. 1, the magazines 2 can be provided on both sides (left and right sides) of the library apparatus 1. In this embodiment, the tape drive 8 is provided at a far backside of the library apparatus 1. The tape drive 8 is for recording data to and/or reproducing data from the cartridge 6. The conveying mechanism 10 is for conveying the cartridge 6. The conveying mechanism 10 is provided at a center part of the library apparatus 1. The barcode reader 11 is mounted on the conveying mechanism 10 at a position facing the barcode labels 13 of the tape cartridges 6. Thereby, the barcode reader 11 can read data from the barcode labels 13 of the tape cartridges 6 installed in a single row inside the magazine 2 when the tape cartridges 6 are moved in correspondence with the below-described magazine insertion operation.

Figure 5:
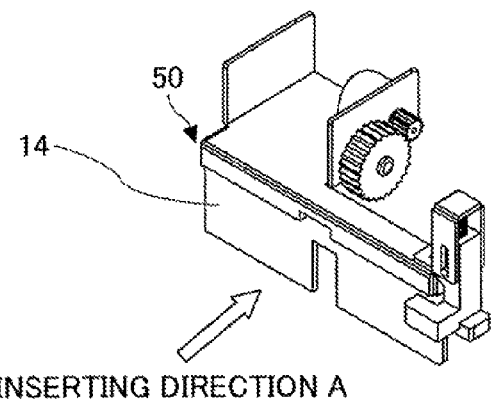
FIG. 5 is a schematic diagram for describing a magazine insertion slot of a library apparatus according to an embodiment of the present invention.

FIG. 5 is a schematic diagram for describing a magazine insertion slot 50 of the library apparatus 1 according to an embodiment of the present invention.

In a case where the operator instructs the magazine 2 to be inserted into or ejected from the library apparatus 1 by operating the operator panel 3, a door panel 14 of the magazine insertion slot 50 of the rack 7 is opened. At a pre-insertion stage, the control device 9 commands the conveying mechanism 10 to move to a position in which the barcode reader 11 is in a barcode label reading position (position for reading the barcode label 13) in response to the instruction from the operator. That is, the pre-insertion stage is a stage where the cartridge tape 6 being installed in the magazine 2 is moved to a position enabling the barcode label 13 to be read by the barcode reader 11. Thus, the moving is completed at the pre-insertion stage. In this embodiment, the door panel 14 is configured to automatically open and close (described below). Before the door panel 14 is opened, the bar code reader 11 is moved to the barcode label reading position.

The barcode reader 11 is movably mounted on the conveying mechanism 10. The barcode reader 11 can be positioned facing the magazine insertion slot 50. Accordingly, at the pre-insertion stage, the barcode reader 11 is moved, in the vicinity of the magazine insertion slot 50, to a position at which the barcode labels 13 can be read (barcode reading position). Once the barcode reader 11 is moved to the barcode reading position, the moving of the barcode reader 11 is completed. Therefore, in this embodiment, a process of reading the barcode labels 13 with the barcode reader 11 and a process of inserting the magazine 2 into the library apparatus 1 are performed substantially in parallel. Thus, the mounting of the magazine 2 (in the library apparatus 1) and the reading of barcode labels 13 are completed substantially at the same time. Therefore, it is possible to quickly move on to a subsequent process after the magazine 2 is mounted in the library apparatus 1. Further, even in a case where the barcode label 13 is illegible (e.g., due to thinning, blurring), the cartridge 6 can be immediately distinguished by clearing (moving) away the barcode reader 11 after the magazine 2 is mounted in the library apparatus 1.

Figure 6:
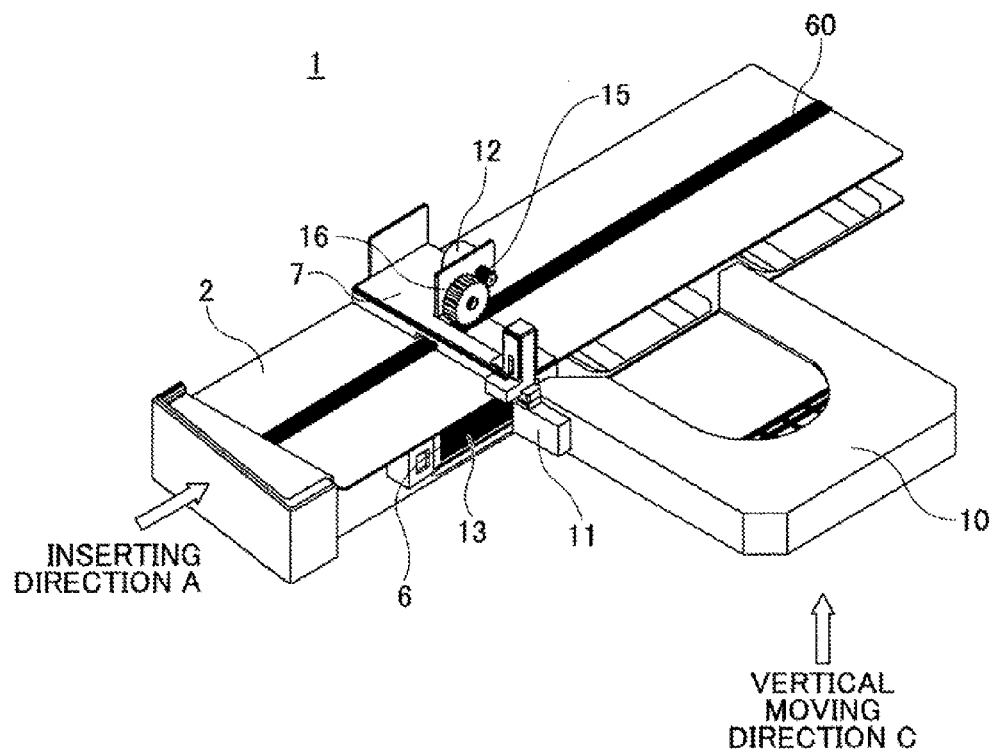
FIG. 6 is a schematic diagram illustrating an exemplary state of performing a magazine insertion operation according to an embodiment of the present invention.

FIG. 6 is a schematic diagram illustrating an exemplary state of performing the magazine insertion operation according to an embodiment of the present invention. In this state, the tape cartridges 6 are mounted in the magazine 2 to be inserted, the barcode labels 13 are adhered to the tape cartridges 6, and the barcode reader 11 is provided on the conveying mechanism 10 for reading the barcode labels 13.

In a case of inserting the magazine 2 into the rack 7 inside the library apparatus 1, the barcode reader 11 reads the barcode labels 13 adhered to the tape cartridges 6 during the inserting of the magazine 2. The rack 7 includes the encoder 12 at a position facing an upper surface of the magazine 2. During the inserting of the magazine 2, the encoder 12 performs encoder output in correspondence with the inserting speed of the magazine 2 and the barcode reader 11 reads data from the barcode labels 13 while synchronizing with the output of the encoder 12.

Next, an example of a barcode reading mechanism is described.

Figure 7:
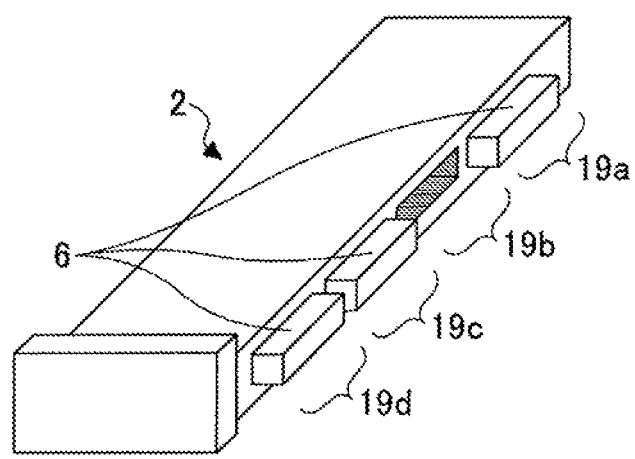
FIG. 7 is a schematic diagram of a magazine according to an embodiment of the present invention.

FIG. 7 is a schematic diagram of the magazine 2 according to an embodiment of the present invention. In this embodiment, the magazine 2 includes four slots 19a-19d for installing tape cartridges 6. In the example of FIG. 7, no tape cartridge 6 is installed in the slot 16b.

Figure 8:
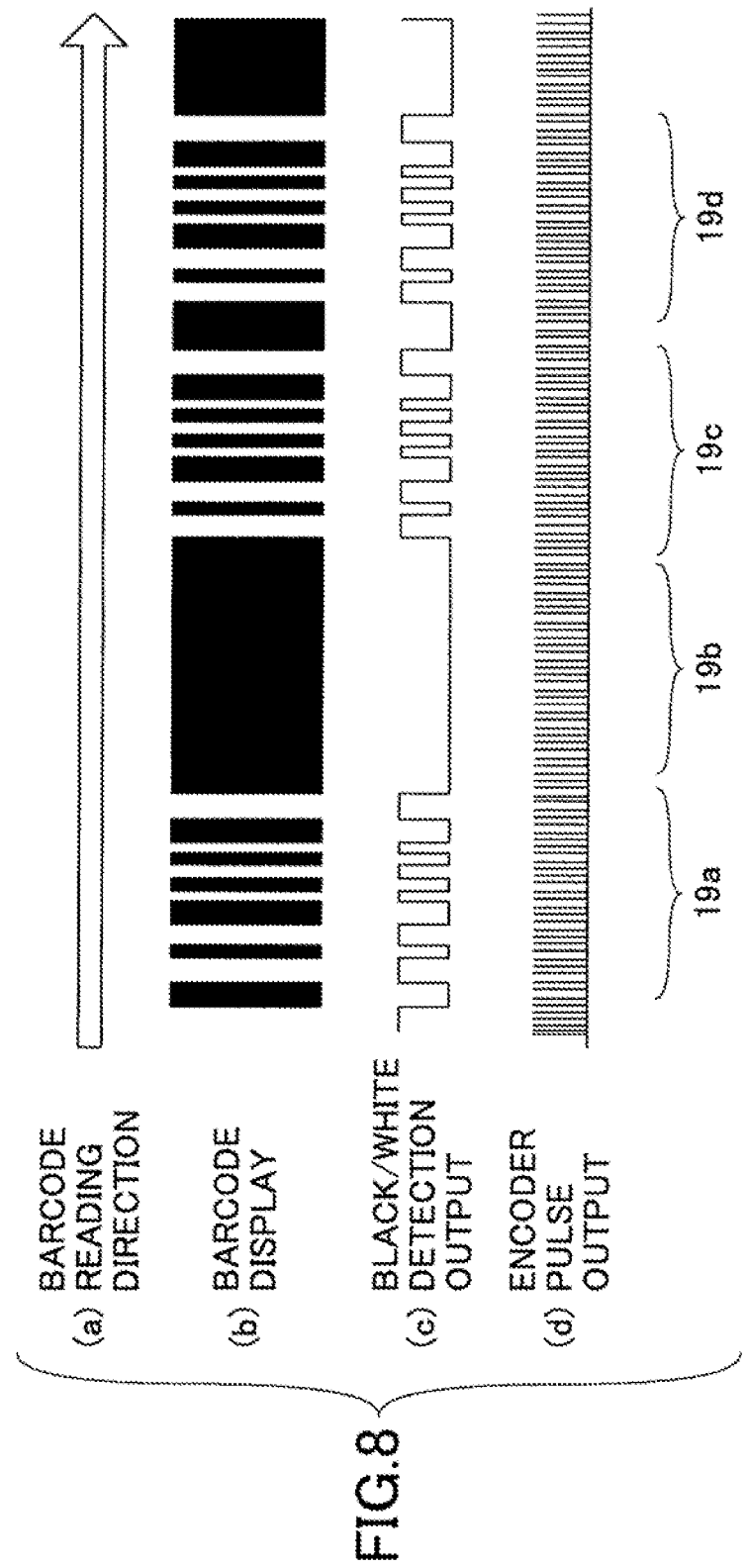
FIG. 8 is a schematic diagram for illustrating encoder output and barcode output in a case of reading barcodes while the magazine illustrated in FIG. 7 is inserted into a rack of the library apparatus according to an embodiment of the present invention.

FIG. 8 is a schematic diagram for illustrating encoder output and barcode output in a case of reading barcodes 13 while the magazine 2 illustrated in FIG. 7 is inserted into the rack 7 of the library apparatus 1. FIG. 8(a) indicates the direction of inserting the magazine 2 and the direction of scanning (reading) with the barcode reader 11. That is, the magazine 2 is inserted and data are read from the barcode labels 13 on the tape cartridges 6 in the direction of the arrow of FIG. 8(a). FIG. 8(b) illustrates the display of a barcode labels (barcode display) adhered to the tape cartridges 6. In FIG. 8(b), although barcode labels corresponding to the slots 19a, 19c, and 19d are displayed, there is no barcode display corresponding to the slot 19b because there is no cartridge 6 installed in the slot 19b.

Figure 9:
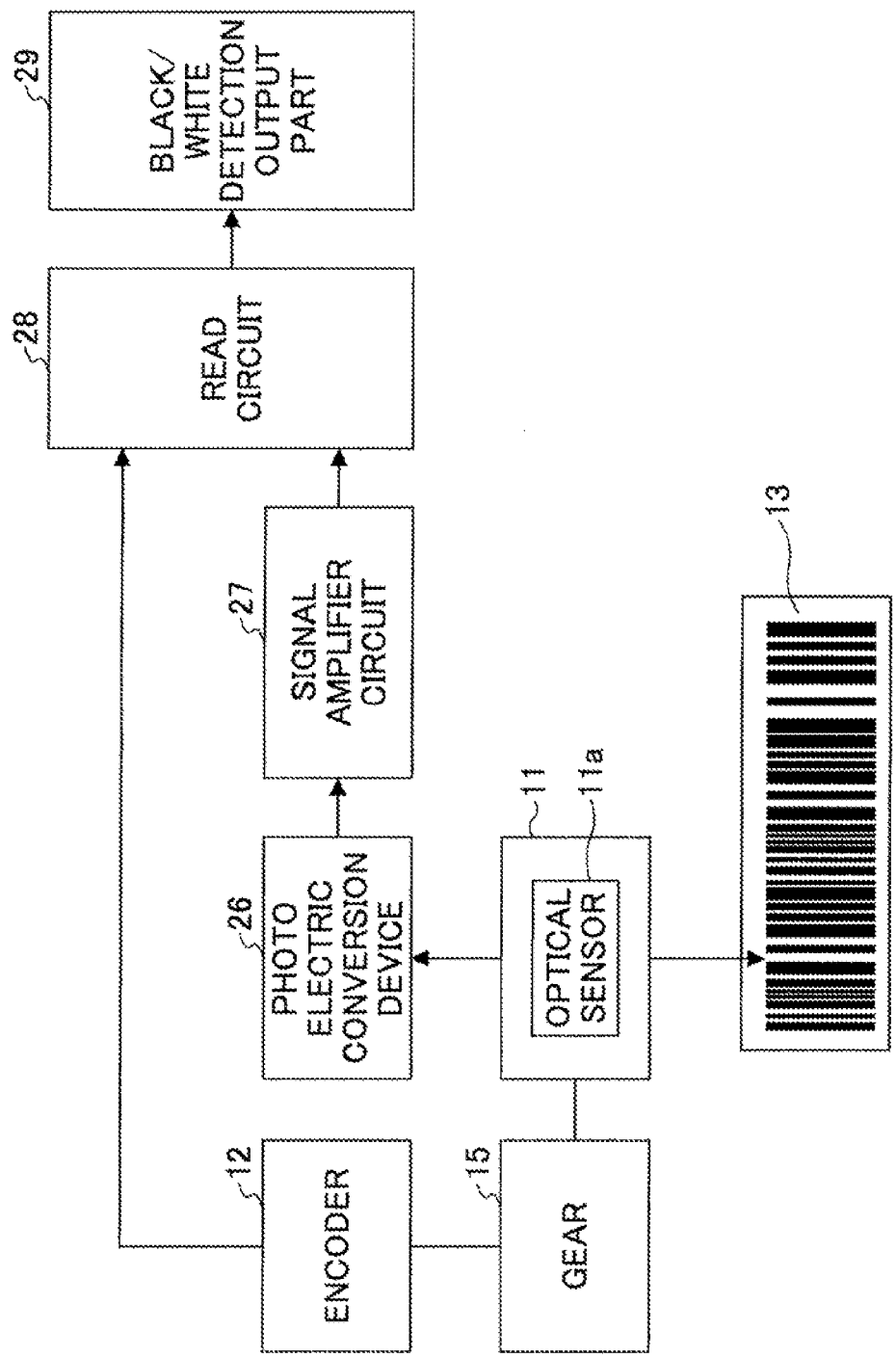
FIG. 9 is a schematic diagram illustrating an exemplary configuration of a barcode reading mechanism according to an embodiment of the present invention.

FIG. 9 is a schematic diagram illustrating an exemplary configuration of the barcode reading mechanism according to an embodiment of the present invention. In the library apparatus 1, a gear 16 provided to be driven by a belt-like gear 60 on the upper surface of the magazine 2 is positioned in an interlocking manner with respect to a gear 15 provided in the encoder 12 of the rack 7 (see, for example, FIG. 6). Accordingly, the gear 16 and the gear 15 are meshed when the magazine 2 is inserted into the rack 7. As described above, when the magazine 2 is being inserted into the rack 7 by the user, the barcode labels 13 adhered to the tape cartridges 6 are scanned by the barcode reader 11 attached to the conveying mechanism 10. When the magazine 2 is being inserted into the rack 7, the inserting speed (inserting rate) of the magazine 2 is input from the gear 16 to the encoder 12. Then, the encoder 12 encodes the input inserting speed and outputs an encoder pulse (signal) to a read circuit 28 as illustrated in FIG. 8(d). Then, read barcode data, which are read by the optical sensor 11a built inside the barcode reader 11, are converted into electric signals by a photoelectric conversion device 26. Then, a signal amplifier circuit 27 amplifies the electric signals of the barcode illustrated in FIG. 8(b) into digital signals and are input to the read circuit 28 as illustrated in FIG. 8(c). The read circuit 28 obtains a barcode width of a predetermined value by synchronizing with signals generated from the encoder 12 and reading the input digital signals of the barcode data. Accordingly, even in a case where there is an inconsistency in the speed of inserting the magazine 2, the reading of the barcode label 13 by the barcode reader 11 can be stable.

FIG. 8(c) illustrates the black/white detection output when reading data from the barcode label 13 illustrated in FIG. 8(b). As illustrated in FIG. 8(b), although there is output from the barcode reader 11 with respect to the slots 19a, 19c, and 19d having the tape cartridges 6 installed therein, there is no output from the barcode reader 11 with respect to the slot 19b having no cartridge 6 installed therein. By the reading of the barcode labels 13 by the barcode reader 11, data indicating the existence of the tape cartridges 6 inside the slots 19a-19d, data indicating the locations in which the tape cartridges 6 are installed, and identification data coded in the barcode labels 13 can be recognized (determined). Such data are reported to the control device 9 of the library apparatus 1 and stored in a memory (not illustrated) in the control device 9.

It is to be noted that, although an embodiment of the present invention is described above using an example of reading data from a barcode label 13 adhered to a cartridge 6 with a barcode reader 11, an embodiment of the present invention may be described by using an example of reading data from a wireless communications tag such as an RFID tag with an RFID reader.

Even in a case where the library apparatus 1 includes plural magazines 2, the barcode reader 11 can be positioned with respect to plural magazine insertion slots owing to the barcode reader 11 being attached to the conveying mechanism 10. Accordingly, there is no need to provide plural barcode readers 11. Further, in a case where there are plural conveying mechanisms 10, the barcode reader 11 can be provided on each conveying mechanism 10.

Figure 10:
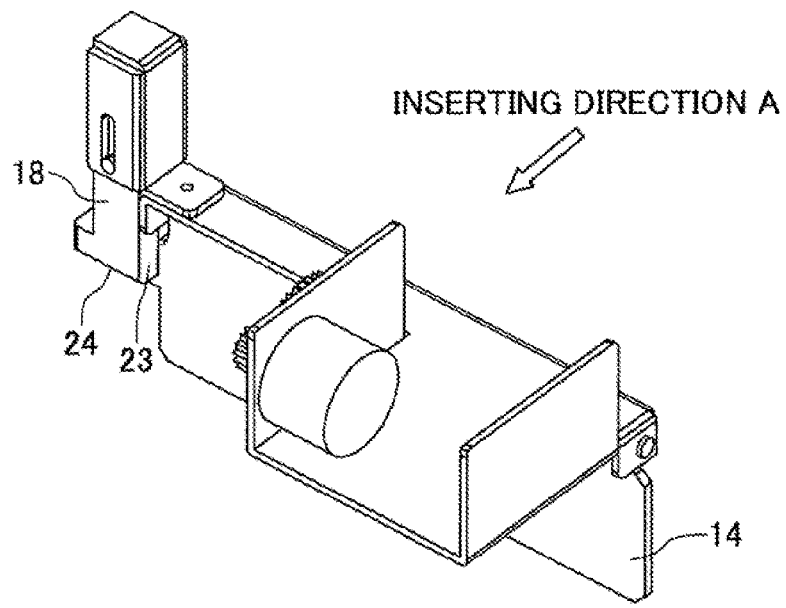
FIG. 10 is a schematic diagram for describing a locked state of the door panel of a door panel locking mechanism according to an embodiment of the present invention.

Next, a mechanism for inserting and ejecting the magazine 2 according to an embodiment of the present invention is described. FIG. 10 is a schematic diagram for describing a locked state of the door panel 14 of a door panel locking mechanism according to an embodiment of the present invention. FIG. 10 illustrates where the magazine 2 is not inserted into the library apparatus 1. In this embodiment, a stopper 23 is provided in a lock bar 18. In FIG. 10, the door panel 14 is fixed (secured) with respect to the magazine inserting direction illustrated with arrow A and is in the locked state preventing the magazine 2 from being inserted. A bottom surface of the lock bar 18 is referred to as a "lock bar bottom surface 24".

Figure 11:
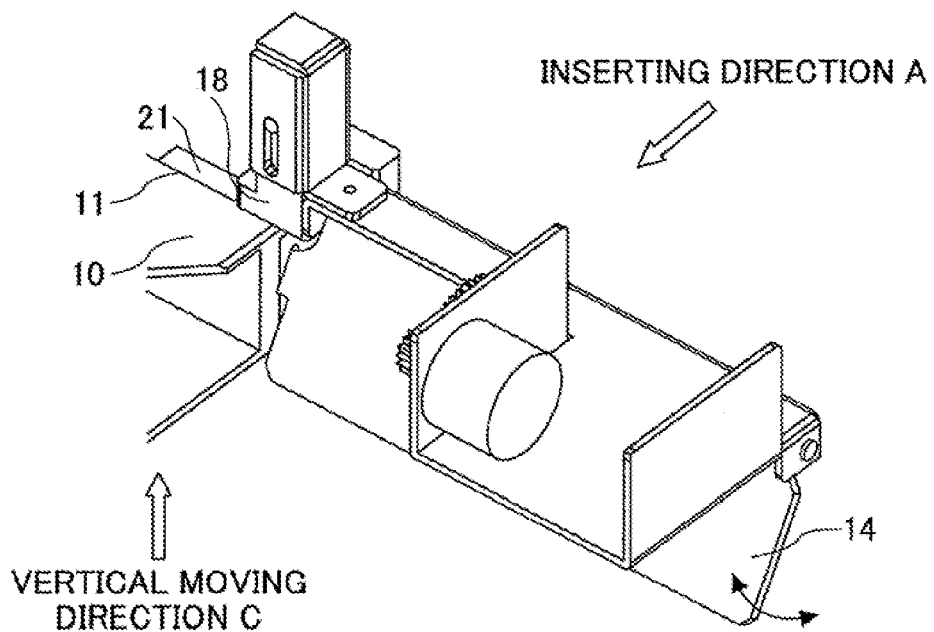
FIG. 11 is a schematic diagram for describing where a door panel is unlocked according to an embodiment of the present invention.

FIG. 11 is a schematic diagram for describing where the door panel 14 is unlocked according to an embodiment of the present invention.

Next, the releasing of the locked state is described in detail. In response to a command (request) for inserting the magazine 2, the control device 9 instructs the conveying mechanism 10 to move to a position allowing the barcode reader 11 to read barcodes (identifiers) 13. In this embodiment, the direction in which the conveying mechanism 10 moves is indicated with arrow C (i.e. from the bottom to top of the library apparatus 11) in FIG. 11. When the barcode reader 11 reaches the barcode reading position, an opposing surface 21 (i.e. upper surface of the barcode reader 11) lifts the lock bar 18 upward by being pressed against the lock bar bottom surface 24. By pressing the entire lock bar 18 upward, the stopper 23 fixed to the door panel 14 is also pressed upward. Accordingly, the stopper 23 moves apart from the door panel 14 and separates from the door panel 14. Thereby, the door panel 14 is unlocked and the magazine 2 can be inserted into the library apparatus 1.

Figure 12:
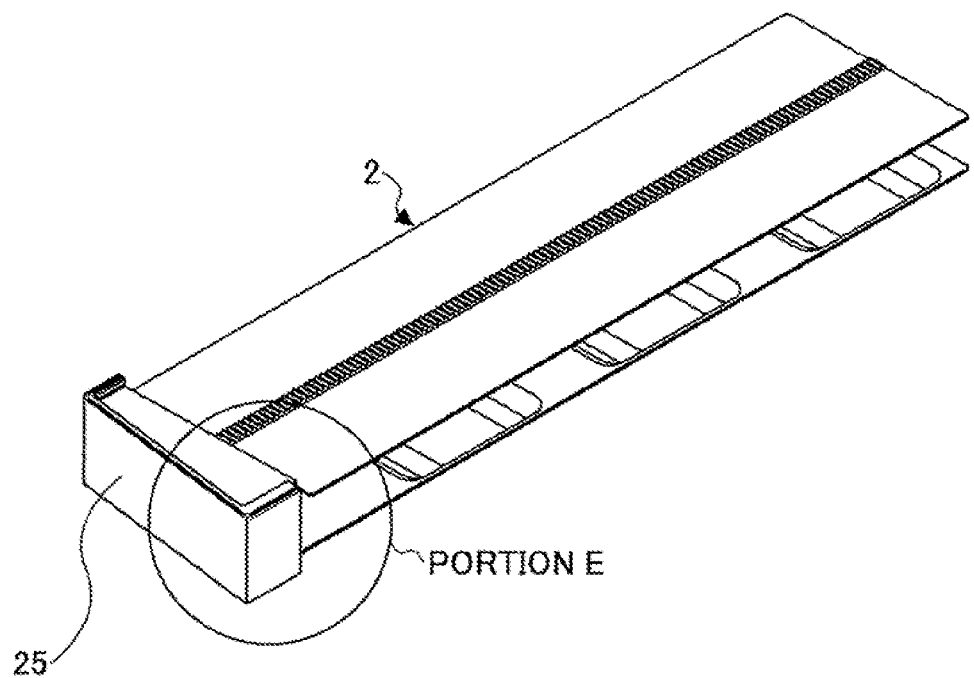
FIG. 12 is a perspective view of a magazine where the magazine is viewed from an upper side.
Figure 13:
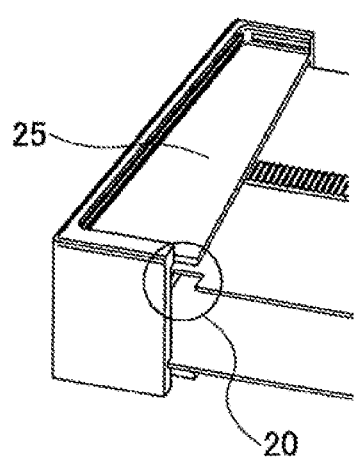
FIG. 13 is a schematic view illustrating an enlargement of a portion E of FIG. 12.

A modified example of the mechanism controlling the inserting and ejecting of the magazine 2 is described according to an embodiment of the present invention. FIG. 12 is a perspective view of the magazine 2 where the magazine 2 is viewed from an upper side. In this example, the magazine 2 has a long thin box-like shape and includes a front cover 25 attached to a front side of the magazine 2. Plural tape cartridges 6 can be installed inside the magazine 2. FIG. 13 is a schematic view illustrating an enlargement of a portion E of FIG. 12. A notch part 20 is provided at a far side of the front cover 25.

Figure 14:
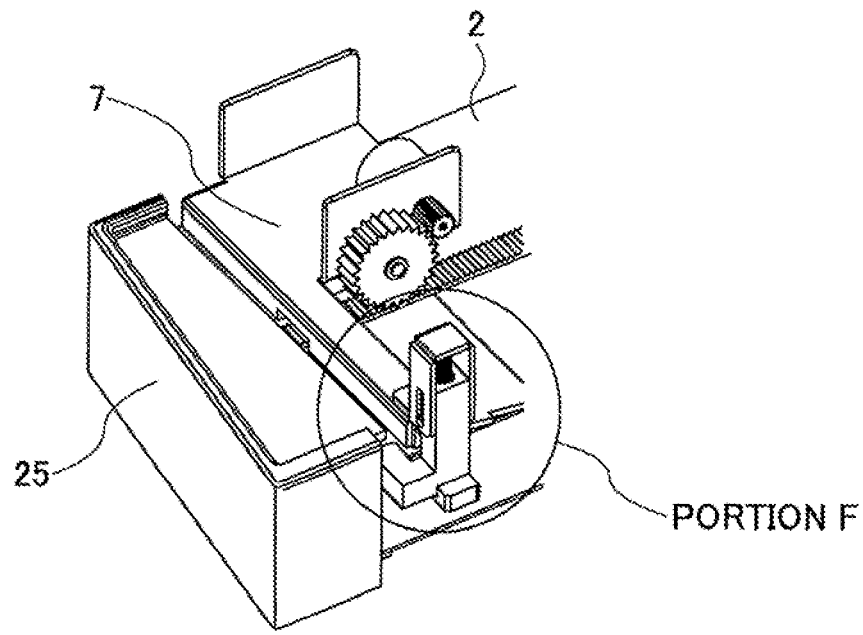
FIG. 14 is a schematic diagram for describing a locked state of a magazine of a modified example.
Figure 15:
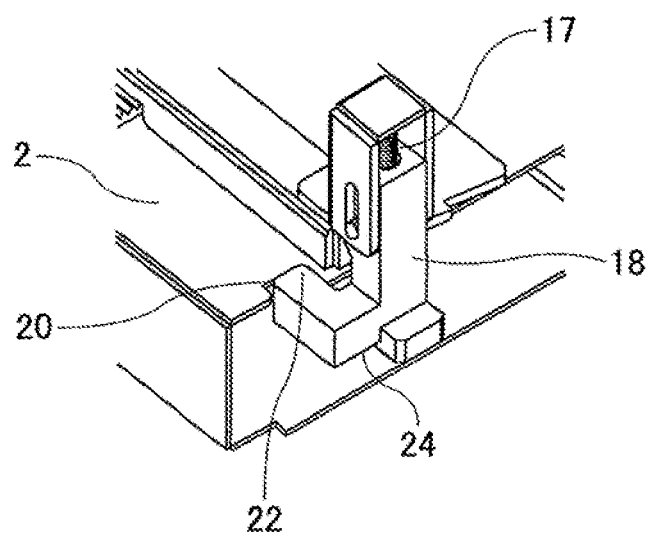
FIG. 15 is a schematic diagram illustrating an enlargement of portion F of FIG. 14.

FIG. 14 is a schematic diagram for describing a locked state of the magazine 2 of the modified example. FIG. 14 illustrates a state where the magazine 2 is inserted into the library apparatus 1. FIG. 15 is a schematic diagram illustrating an enlargement of portion F of FIG. 14 (front cover 25 not illustrated). A protruding part 22 is provided on the lock bar 18. In this modified example, a spring 17 is assembled in the lock bar 18.

After the magazine 2 is inserted into the rack 7, the conveying mechanism 10 moves to the label reading position. Then, the moving of the conveying mechanism 10 causes the opposing surface 21 to separate from the lock bar bottom surface 24. The lock bar bottom surface 24 is pressed downward by the opposing surface 21. This causes the lock bar 18 to move downward. Then, the protruding part 22 enters and engages the notch part 20, such that the magazine 2 and the lock bar 18 become fixed to each other. Thereby, the magazine 2 becomes immovable. Thus, even in a case where stress is applied to the library apparatus 1, the magazine 2 can be securely installed and maintained inside the library apparatus 1.

Figure 16:
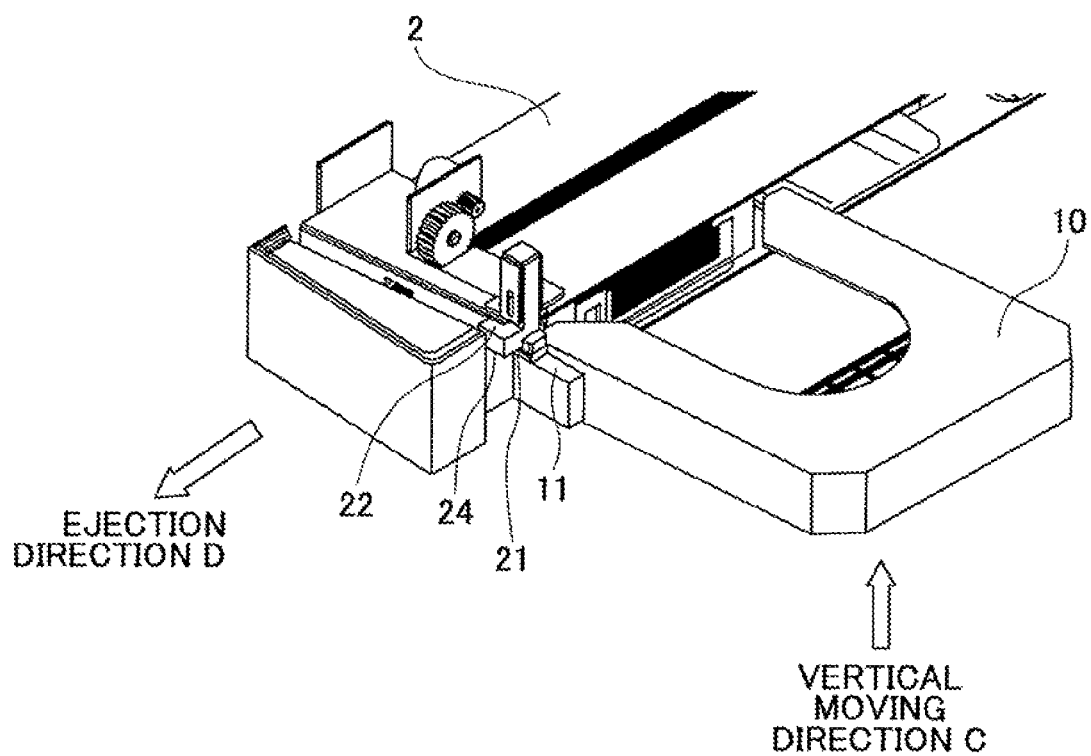
FIG. 16 is a schematic diagram for describing releasing of a locked state of a magazine according to a modified example.

FIG. 16 is a schematic diagram for describing the releasing of the locked state of the magazine 2 according to the modified example. In ejecting the magazine 2 from the library apparatus 1, the conveying mechanism 10 is moved to the barcode label reading position in accordance with a magazine ejection command from the control device 9. Alternatively, the conveying mechanism 10 may be moved to the label reading position by a magazine inserting command. In other words, as long as the barcode reader 11 is moved to the barcode label reading position at the pre-insertion stage, the conveying mechanism 10 may be moved to the label reading position anytime. When the barcode reader 11 reaches the barcode reading position, the opposing surface 21, which is the upper surface of the barcode reader 11, presses against the lock bar bottom surface 24. Thereby, the lock bar 18 is lifted upward. Then, the protruding part 22 of the lock bar 18, being engaged to the notch part 20 of the magazine 2, is moved in a direction separating from the notch part 20. By the disengagement of the protruding part 22 and the notch part 20, the fixed state between the magazine 2 and the lock bar 18 is released. Thereby, the magazine 2 is released from the locked state and is able to be ejected from the library apparatus 1 in the ejecting direction illustrated with arrow D in FIG. 16.

With the library apparatus 1 according to the above-described embodiment of present invention, the barcode reading process by the barcode reader can be performed in parallel with the magazine inserting process. Therefore, a subsequent process can be promptly executed after the magazine 2 is installed in the library apparatus 1. Further, even in a case where there is a barcode that cannot be identified (e.g., due to thinning, blurring), a corresponding cartridge can be immediately distinguished by moving away the barcode reader 11 after the magazine 2 is mounted in the library apparatus 1.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A library apparatus comprising:
   a rack that holds a magazine loaded with a plurality of tape cartridges, the rack including an insertion slot that allows the magazine to be inserted into the rack;
   a conveying mechanism that attaches the plural tape cartridges to the magazine and detaches the plural tape cartridges from the magazine, the conveying mechanism including a reader configured to read an identifier provided on each of the plural tape cartridges; and
   a control device that moves the conveying mechanism, prior to the magazine being inserted into the insertion slot, to an identifier reading position enabling the reader to read the identifiers as the magazine is inserted through the insertion slot;
   wherein the reader is movably mounted to the conveying mechanism to read the identifiers by moving in a direction parallel to a direction in which the magazine is inserted,
   wherein the reader is configured to move in the direction parallel to the direction in which the magazine is inserted while the magazine is being inserted through the insertion slot.

2. The library apparatus according to claim 1, wherein the reader is configured to obtain cartridge position data and identification data corresponding to each of the plural tape cartridges.

3. The library apparatus according to claim 1, wherein the identifier is a barcode, wherein the reader is a barcode reader.

4. The library apparatus according to claim 1, wherein the identifier is a wireless communications tag, wherein the reader is a wireless communications tag reader.

5. A library apparatus comprising:
   a rack that holds a magazine loaded with a plurality of tape cartridges, the rack including an insertion slot that allows the magazine to be inserted into the rack;
   a conveying mechanism that attaches the plural tape cartridges to the magazine and detaches the plural tape cartridges from the magazine, the conveying mechanism including a reader configured to read an identifier provided on each of the plural tape cartridges;
   a control device that moves the conveying mechanism, prior to the magazine being inserted into the insertion slot, to an identifier reading position enabling the reader to read the identifiers as the magazine is inserted through the insertion slot; and
   an encoder attached to the rack;
   wherein the encoder is configured to output encoder signals in correspondence with an inserting speed of the magazine while the magazine is being inserted through the insertion slot,
   wherein the reader is configured to read data from the identifier in synchronization with the output of the encoder.

6. The library apparatus according to claim 1, further comprising:
   a door panel provided in the insertion slot; and
   a locking mechanism that locks the door panel to a predetermined position when the magazine is not being inserted through the insertion slot.

7. A library apparatus comprising:
   a rack that holds a magazine loaded with a plurality of tape cartridges, the rack including an insertion slot that allows the magazine to be inserted into the rack;
   a conveying mechanism that attaches the plural tape cartridges to the magazine and detaches the plural tape cartridges from the magazine, the conveying mechanism including a reader configured to read an identifier provided on each of the plural tape cartridges;
   a control device that moves the conveying mechanism, prior to the magazine being inserted into the insertion slot, to an identifier reading position enabling the reader to read the identifiers as the magazine is inserted through the insertion slot;
   a door panel provided in the insertion slot; and
   a locking mechanism that locks the door panel to a predetermined position when the magazine is not being inserted through the insertion slot;
   wherein the locking mechanism includes a lock bar having a stopper engaged to the door panel and a bottom surface that faces an upper surface of the reader,
   wherein the door panel is unlocked by pressing the upper surface of the reader against the bottom surface of the lock bar and separating the stopper from the door panel when the reader reaches the identifier reading position.

8. The library apparatus according to claim 7, wherein the magazine includes a notch part, the lock bar further includes a protruding part, wherein the protruding part is configured to lock the magazine to a predetermined position by engaging with the notch part when the reader deviates from the identifier reading position after the magazine is installed in the rack.

9. The library apparatus according to claim 8, wherein the protruding part is configured to unlock the magazine by disengaging from the notch part when the reader moves to the identifier reading position according to a magazine ejection command from the control device.

* * * * *